US008622403B2

(12) United States Patent
Tan et al.

(10) Patent No.: US 8,622,403 B2
(45) Date of Patent: Jan. 7, 2014

(54) TRANSPORT CART FOR LOADING AN AIRCRAFT GALLEY

(75) Inventors: Joyce Tan, Gilching (DE); Andreas Baatz, Sauensiek (DE); Robert Henshaw, Newnan, GA (US)

(73) Assignee: Airbus Operations GmbH, Hamburg (DE)

( * ) Notice: Subject to any disclaimer, the term of this patent is extended or adjusted under 35 U.S.C. 154(b) by 163 days.

(21) Appl. No.: 13/143,016

(22) PCT Filed: Oct. 20, 2009

(86) PCT No.: PCT/EP2009/007517
§ 371 (c)(1),
(2), (4) Date: Sep. 26, 2011

(87) PCT Pub. No.: WO2010/075905
PCT Pub. Date: Jul. 8, 2010

(65) Prior Publication Data
US 2012/0007324 A1 Jan. 12, 2012

Related U.S. Application Data

(60) Provisional application No. 61/141,317, filed on Dec. 30, 2008.

(30) Foreign Application Priority Data

Dec. 30, 2008 (DE) .......................... 10 2008 063 248

(51) Int. Cl.
*B62B 1/00* (2006.01)
(52) U.S. Cl.
USPC ...................................................... 280/47.35
(58) Field of Classification Search
USPC ........ 280/43.14, 47.131, 47.29, 47.18, 47.27, 280/652, 651, 37, 33.991, 33.992; 312/409, 312/4, 204, 401, 234
See application file for complete search history.

(56) References Cited

U.S. PATENT DOCUMENTS 3,868,123 A * 2/1975 Berg et al. ..................... 280/79.2
4,092,031 A * 5/1978 Greer et al. ................... 280/28.5
(Continued)

FOREIGN PATENT DOCUMENTS

DE 6942398 4/1970
DE 19639123 11/1997
(Continued)

OTHER PUBLICATIONS

International Search Report, PCT/EP2009/007517, International Search Authority/DE Airbus Deutschland GmbH, Jan. 29, 2010.

(Continued)

*Primary Examiner* — John Walters
*Assistant Examiner* — James Triggs
(74) *Attorney, Agent, or Firm* — Krieg DeVault, LLP

(57) ABSTRACT

The invention relates to a transport cart (10) for loading an aircraft galley, comprising a base element (12) and a plurality of wheels (14) attached to the base element (12). Two frame elements (20, 24) are connected to the base element (12) and disposed at a distance from each other. A first guide device (28, 28', 28") is set up for engaging a complementary second guide device formed on a box that is receivable in the aircraft galley to be loaded and for transporting on the transport cart (10). The first guide device (28, 28', 28") is further set up for securing the box against displacement on the transport cart (10) in a direction perpendicular to a longitudinal axis (L) of the transport cart (10) when engaged with the complementary second guide device formed on the box. The transport cart (10) finally comprises a locking mechanism (40, 40') which is set up for securing the box against displacement on the transport cart in a direction parallel to the longitudinal axis (L) of the transport cart (10).

14 Claims, 8 Drawing Sheets

(56) References Cited

U.S. PATENT DOCUMENTS

Figure 1:
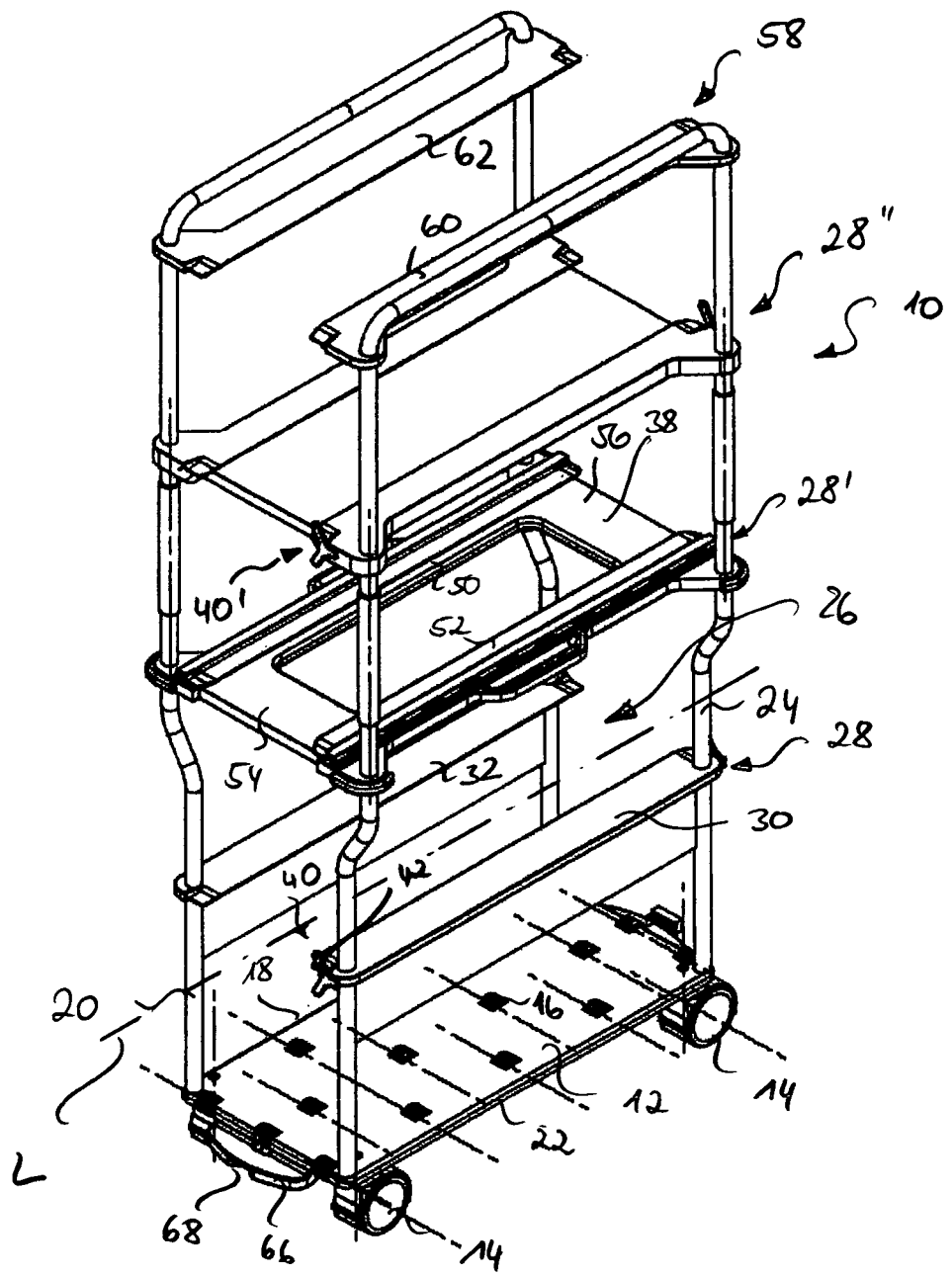

| | | | |
|---|---|---|---|
| 5,011,240 A * | 4/1991 | Kelley et al. | 312/249.12 |
| 6,055,996 A | 5/2000 | Sprenger et al. | |
| 6,425,649 B2 * | 7/2002 | Kasuya | 312/409 |
| 2011/0089671 A1 * | 4/2011 | Baatz et al. | 280/651 |

FOREIGN PATENT DOCUMENTS

| | | |
|---|---|---|
| DE | 102006014699 | 7/2007 |
| WO | WO 89/04624 | 6/1989 |
| WO | WO 2007/096000 | 8/2007 |
| WO | WO 2008/095514 | 8/2008 |

OTHER PUBLICATIONS

English language machine translation for DE 19639123 C1, Nov. 20, 1997.

English language machine translation for DE 102006014699 A1, Jul. 5, 2007.

English language machine translation for DE 6942398, Apr. 9, 1970.

* cited by examiner

TRANSPORT CART FOR LOADING AN AIRCRAFT GALLEY

CROSS REFERECE TO RELATED APPLICATIONS

The present application is a §371 national stage patent application of PCT/EP2009/007517, filed Oct. 20, 2009, claiming priority to German Patent Application No. 10 2008 063 248.1 and US Provisional Patent Application No. 61/141, 317, both filed Dec. 30, 2008, which are incorporated herein by reference.

The present invention relates to a transport cart for loading an aircraft galley, for example with service products required for provisioning the passengers on board the aircraft.

At present, it is usual for some of the service products required for provisioning the passengers on board a commercial aircraft, such as, for example, foodstuffs or beverages, to be loaded into trolleys. The loading of the trolleys is performed by a catering firm responsible for supplying the service products. The filled trolleys are brought on board the aircraft and accommodated in corresponding trolley receiving regions in the galleys of the aircraft. When the aircraft is in flight, some of the trolleys accommodated in the trolley receiving regions in the galleys are used for service tasks, i.e. the distribution of meals and beverages to the passengers in the passenger cabin. The rest of the trolleys, on the other hand, remain in the trolley receiving regions in the galleys throughout the entire flight. Since they are equipped with a stable, impact-resistant housing, wheels, brakes, etc., trolleys have a relatively large volume and a relatively high weight. In particular, the trolleys not used for service tasks result in an increased space requirement and additional weight in the galleys of the aircraft.

Service products that are not to be loaded into trolleys are brought on board the aircraft by means of a transport cart by the catering firm responsible for supplying the service products, and they are stored there manually, in cabinets provided in the galleys. After being unloaded, the transport cart is brought back off the aircraft. The manual loading of the galley cabinets is relatively time-consuming. Further, in particular the loading of galley upper cabinets, i.e. cabinets disposed in an upper section of the galleys, requires the application of a relatively large amount of effort.

Known from WO 2007/096000 A1 is an aircraft galley of modular design, which comprises a basic body having a plurality of compartments. The compartments receive boxes of differing sizes, in which service products required for provisioning the passengers on board the aircraft, such as, for example, foodstuffs or beverages, can be accommodated. Further, various appliances such as, for example, an oven or a microwave appliance, are disposed in the compartments of the basic body.

The invention is based on the object of providing a transport cart that enables an aircraft galley to be loaded in a simple, safe and convenient manner, for example with products required for provisioning the passengers on board the aircraft, and that is suitable, in particular, for loading an aircraft galley of modular design known from WO 2007/096000 A1.

A transport cart, according to the invention, for loading an aircraft galley comprises a base element configured, for example, in the form of a plate. A plurality of wheels are attached to the base element, i.e. to an underside of the base element. Further, two frame elements, disposed at a distance from each other, are connected to the base element. For example, a first frame element can be connected to the base element in the region of a first edge of the base element, and a second frame element can be connected to the base element in the region of a second edge of the base element that is opposite the first edge of the base element. For example, the frame elements can each be constituted by a substantially U-shaped tube.

The transport cart according to the invention further comprises a first guide device, which is set up for engaging a complementary second guide device formed on a box that can be received in the aircraft galley to be loaded and provided for transporting in the transport cart. The first guide device is set up for securing the box against displacement on the transport cart in a direction perpendicular to a longitudinal axis of the transport cart when engaged with the complementary second guide device formed on the box. A longitudinal axis of the transport cart is understood here as an axis aligned in the normal direction of travel of the transport cart. In acting together with the complementary second guide device configured on the box, the first guide device thus ensures that a box transported on the transport cart does not become displaced on the transport cart in an unwanted manner, for example when the transport cart travels over uneven ground.

The first guide device of the transport cart according to the invention is preferably designed such that it corresponds to a guide device provided in the aircraft galley to be loaded, for the purpose of acting together with the second guide device configured on the box, to such an extent that the second guide device formed on the box can be brought into engagement both with the first guide device of the transport cart and with the guide device provided in the aircraft galley to be loaded. Only a second guide device, which can act together with the first guide device of the transport cart during the transporting of the box on the transport cart, need then be configured on the box. When the box is received in the aircraft galley, on the other hand, the second guide device configured on the box can then act together with the guide device of the aircraft galley.

Further, the transport cart according to the invention comprises a locking mechanism configured for securing the box against displacement on the transport cart in a direction parallel to the longitudinal axis of the transport cart. In other words, the locking mechanism serves to prevent the box falling down from the transport cart in an unwanted manner, for example when the transport cart is moved in the direction of the longitudinal axis of the transport cart. Since the transport cart according to the invention is provided with a locking mechanism, the transport cart need not be provided with a closed receiving container or the like. As a result, the transport cart can be designed so as to be relatively light in weight. By means of the transport cart according to the invention, an aircraft galley can be loaded with boxes containing, for example, service products required for provisioning the passengers on board the aircraft, in a simple, convenient and safe manner.

The first guide device of the transport cart according to the invention is preferably swivelable between an operative position, in which it can engage a complementary second guide device configured on a box, and a non-operative position, in which no connection of the first guide device to a complementary second guide device configured on a box is possible. When the first guide device is in its operative position, the transport cart according to the invention can therefore be loaded with a box carrying a complementary second guide device. In its non-operative position, on the other hand, the first guide device is preferably disposed such that the transport cart can be used to transport another item, for example a box not equipped with a second guide device, or a larger box, without the loading or unloading of the transport cart being impeded by the first guide device.

For example, the first guide device, in its operative position, can project into an inner region of the transport cart delimited by the frame elements. The first guide device can then, for example, act together with a complementary second guide device disposed in the region of a side wall of a box provided for transporting on the transport cart. In its non-operative position, on the other hand, the first guide device preferably substantially releases the inner region of the transport cart delimited by the frame elements. When the first guide device is in its non-operative position, the inner region of the transport cart can therefore be loaded in an unimpeded manner with other items such as, for example, a box not equipped with a second guide device, or a larger box.

The first guide device can comprise, for example, a rail, which is provided to act together with a component of the second guide device configured on the box that is designed so as to be complementary to the shape of the rail. Alternatively thereto, the second guide device configured on the box can also comprise a rail, which is set up to act together with a component of the first guide device configured so as to be complementary to the shape of the rail. A particularly secure connection of the first guide device to the second guide device can then be ensured if the first guide device and the complementary second guide device configured on the box constitute a tongue and groove connection. For example, the first guide device can comprise a projection shaped such that it is suitable for being received in a groove of the second guide device configured on the box. Alternatively thereto, the second guide device configured on the box can also have a projection shaped such that it is suitable for being received in a groove of the first guide device of the transport cart.

The locking mechanism of the transport cart according to the invention preferably comprises a first and a second lock, which are attached to a frame element, at a distance from each other along the longitudinal axis of the transport cart. For example, the first lock can be attached to a frame element in the region of a first end of the transport cart, and the second lock can be attached to the frame element in the region of a second end of the transport cart that is opposite the first end of the transport cart. The locks of the locking mechanism then reliably prevent a box, transported on the transport cart, from falling down from the transport cart in the region of the first or second end, while the frame elements secure the box against falling down sideways. In principle, it is possible for the locks of the locking mechanism to be attached to differing frame elements. Preferably, however, both locks of the locking mechanism are assigned to the same frame element.

The locking mechanism can comprise a coupling device that couples the locks of the locking mechanism to each other in such a way that, upon a movement of the first lock of the locking mechanism into a locking position, the second lock of the locking mechanism is likewise moved into a locking position and, upon a movement of the first lock of the locking mechanism into a non-locking position, the second lock of the locking mechanism is likewise moved into a non-locking position. Similarly, the coupling device preferably has the effect that, upon a movement of the second lock of the locking mechanism into a locking position, the first lock of the locking mechanism is likewise moved into a locking position and, upon a movement of the second lock of the locking mechanism into a non-locking position, the first lock of the locking mechanism is likewise moved into a non-locking position. The coupling device thus makes it possible, through an actuation of an easily accessible first lock, for example disposed in the region of a first end of the transport cart, to effect also an actuation a second lock that is not easily accessible, or not accessible at all, disposed in the region of a second end of the transport cart, and vice versa. The coupling device can comprise, for example, a rod that is rotatable about its longitudinal axis, and which carries the locks of the locking mechanism.

The transport cart according to the invention can further comprise a carrier element that can be attached to at least one frame element and is set up to support a bottom element of a box received on the transport cart or a bottom element of another item received on the transport cart such as, for example, an aircraft galley component. The provision of a carrier element is advantageous, in particular, when an item not provided with a second guide device that is complementary to the first guide device of the transport cart is to be transported on the transport cart. Further, the carrier element can serve to support a bottom element of a particularly heavy box that is not to be held on the transport cart solely by the second guide device configured on the box acting together with the first guide device of the transport cart. The carrier element can comprise a first and a second strip, which are each attached to a frame element and project into an inner region of the transport cart delimited by the frame elements. Further, the carrier element can comprise connecting elements that connect the strips to each other. A carrier element that comprises, instead of a plate-type element, only two strips and connecting elements can be designed so as to be particularly light in weight.

The first guide device can be mounted on a frame element or on the carrier element. For example, the first guide device can be configured in two parts, a part of the first guide device being able to be mounted on each frame element of the transport cart or on each of the strips of the carrier element. Depending on the specific application requirements for the transport cart, the transport cart can be provided with a plurality of first guide devices, of which one or more can be mounted on a frame element and one or more can be mounted on a carrier element.

In particular a first guide device mounted on a carrier element is preferably swivelable between an operative position and a non-operative position. When a first guide device that is hinged to a carrier element in a swivelable manner is in its operative position, a second guide device configured on a box can be brought into engagement with the first guide device, and the box can thereby be secured against displacing on the transport cart in a direction perpendicular to the longitudinal axis of the transport cart. Further, a bottom element of the box can be supported by the carrier element, such that the box can be held securely on the transport cart even if it is of a particularly heavy weight. When a first guide device mounted on a carrier element is in its non-operative position, on the other hand, the carrier element can be used to receive another item on the transport cart, for example a box not provided with a second guide device, or a component of the aircraft galley such as, for example, an oven or the like.

The base element, the first guide device and/or the carrier element is/are preferably disposed in a position on the transport cart that is adapted to a position of an arrangement for receiving a box provided for transporting on the transport cart, or an aircraft galley component in the aircraft galley, in such a way that a box or aircraft galley component received on the transport cart can be loaded from the transport cart into the aircraft galley substantially through a horizontal displacement. For example, the base element of the transport cart can be disposed at a height that corresponds to the height of a bottom plate of a compartment of the aircraft galley disposed in a lower section of the aircraft galley. A box received on the base element of the transport cart can be conveniently pushed from the transport cart into the compartment of the aircraft galley without the need to raise or lower the box.

Similarly, the first guide device of the transport cart can be disposed at a height that corresponds to the height of a guide device of the aircraft galley that, just like the first guide device of the transport cart, can be brought into engagement with a second guide device configured on a box. A box held on the transport cart by the first guide device of the transport cart acting together with the second guide device configured on the box can then be easily pushed from the transport cart into the aircraft galley, the second guide device configured on the box engaging the guide device of the aircraft galley. Finally, the carrier element of the transport cart can be disposed at a height that corresponds to the height of a carrier plate of the aircraft galley that serves to receive aircraft galley components such as, for example, ovens, beverage preparation devices, etc. An aircraft galley component received on the carrier element of the transport cart can then be conveniently pushed from the transport cart to its destination position in the aircraft galley without the need to raise or lower the aircraft galley component.

A plurality of rolls are preferably disposed in the region of a top side of the base element. As a result, a large, heavy box, or another large, heavy item can be loaded onto the base element of the transport cart, and unloaded again from the base element of the transport cart, in a particularly simple and convenient manner.

A blocking device for blocking the wheels of the transport cart preferably comprises a plurality of actuating arrangements. For example, a first actuating arrangement can be disposed in the region of the first end of the transport cart, while a second actuating arrangement is located in the region of a second end that is opposite the first end of the transport cart. The blocking device can then be actuated from both sides of the transport cart in a particularly convenient manner.

The transport cart according to the invention preferably further comprises a holding device, which is set up to interact with a cover element and/or side walls of a box received on the transport cart. Preferably, the holding device is connected to a frame element of the transport cart in an upper region of the transport cart, and serves to additionally secure a box received at the top of the transport cart. Preferably, the holding device projects into the interior of the transport cart that is delimited by the frame elements. In a manner similar to the first guide device, the holding device can also be configured in two parts, such that a first component of the holding device can be attached to the first frame element of the transport cart, while a second component of the holding device can be mounted on the second frame element of the transport cart, opposite the first component.

The transport cart according to the invention preferably further comprises a positioning device, which is set up to interact with a complementary positioning device provided on the aircraft galley to be loaded, in order to position the transport cart relative to the aircraft galley to be loaded. By means of the positioning device it can be ensured that the transport cart, when in operation, is disposed in a position, relative to the aircraft galley, in which the transport cart can be loaded and unloaded in a particularly simple manner, or elements can be removed from the aircraft galley in a particularly simple manner and the aircraft galley can be loaded in a particularly simple manner.

The positioning device can be attached to the base element of the transport cart. Further, the positioning device can be provided with a recess that is set up to receive a projection of the complementary positioning device provided on the aircraft galley to be loaded when the transport cart has attained a desired position relative to the aircraft galley to be loaded. Alternatively thereto, the positioning device of the transport cart can also have a projection provided to be received in a recess of the complementary positioning device provided on the aircraft galley to be loaded.

The spacing of the two frame elements connected to the base element is adapted to the design of the aircraft galley to be loaded, or to the design of the boxes and aircraft galley components to be received in the aircraft galley. In particular, the spacing of the two frame elements connected to the base element can correspond to the width of compartments provided in the aircraft galley and, if the width of these compartments varies in dependence on the height of the aircraft galley, can vary likewise. Preferably, however, the spacing of the two frame elements connected to the base element is less than the width of an aisle of an aircraft in which the aircraft galley to be loaded is disposed. The transport cart can then, if required, be moved through the aisle of the aircraft in a convenient manner.

Figure 2:
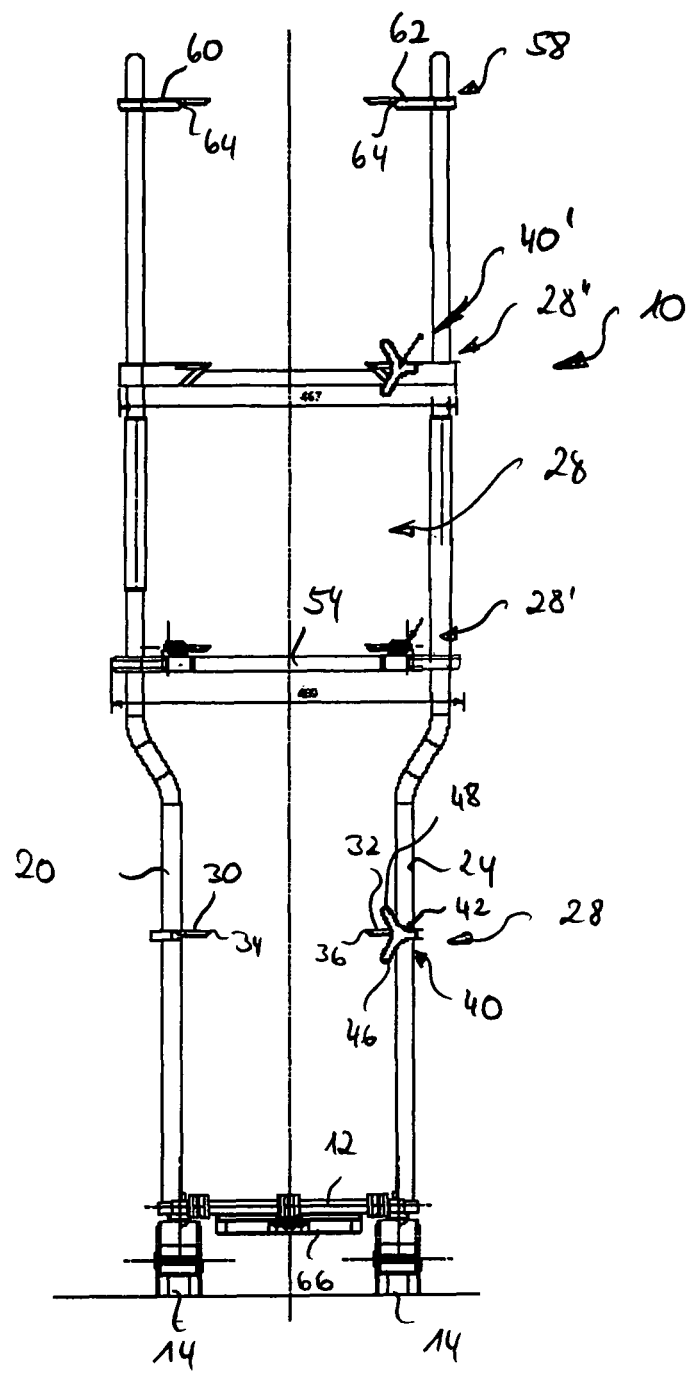
Figure 3:
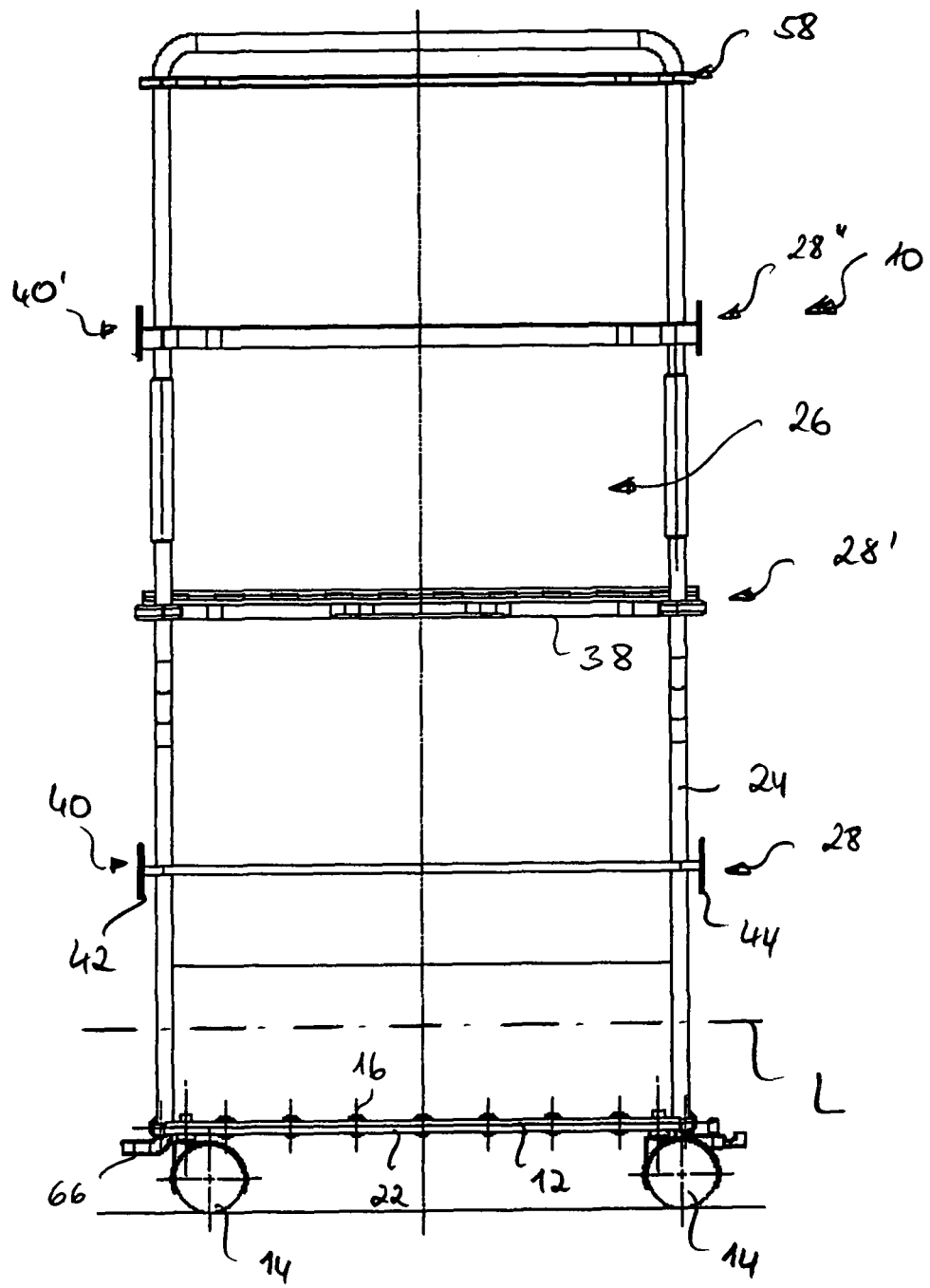
Figure 4:
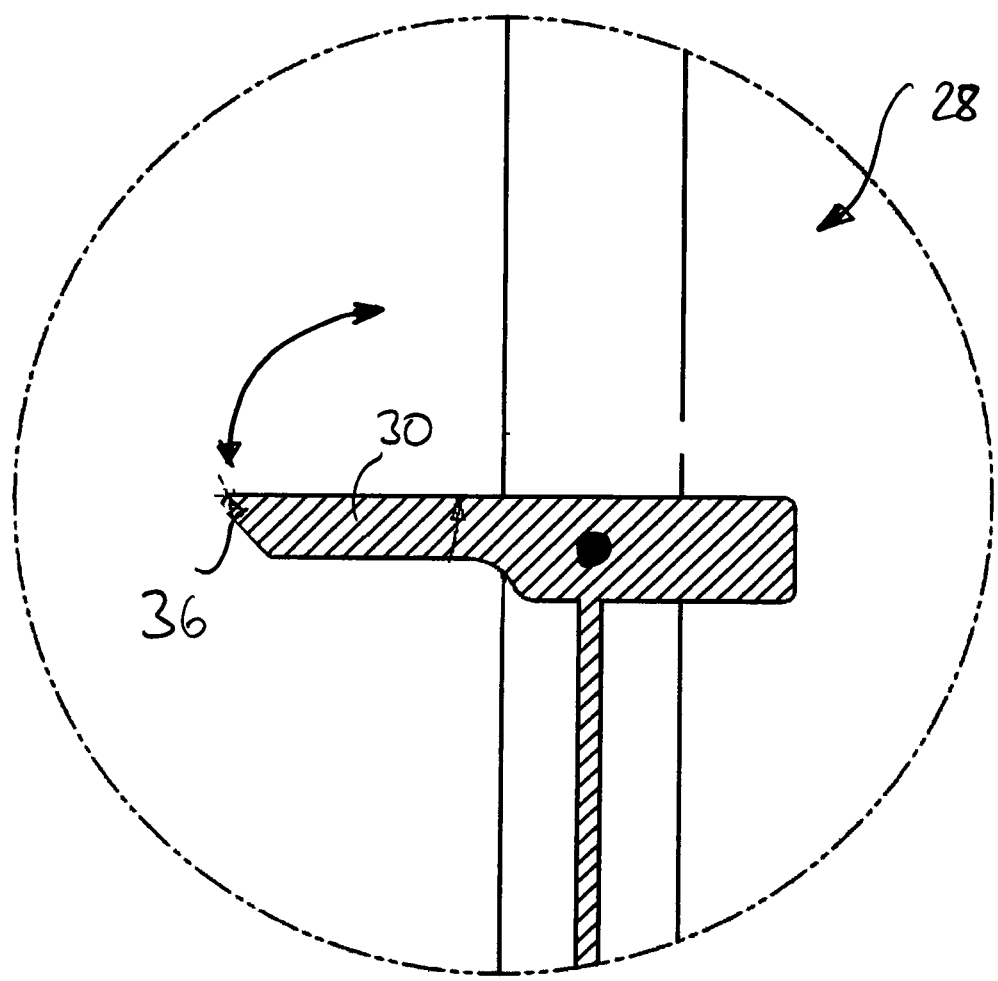
Figure 5:
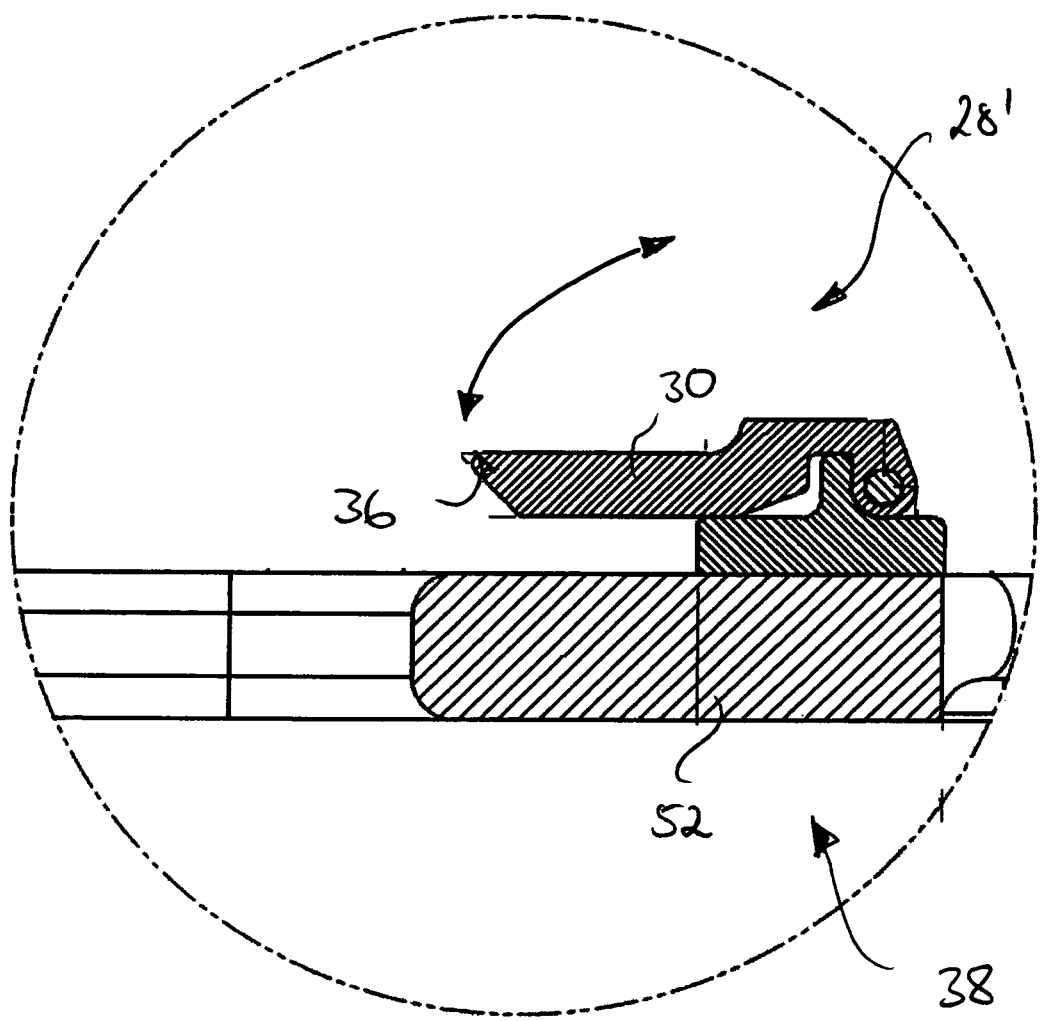
Figure 6:
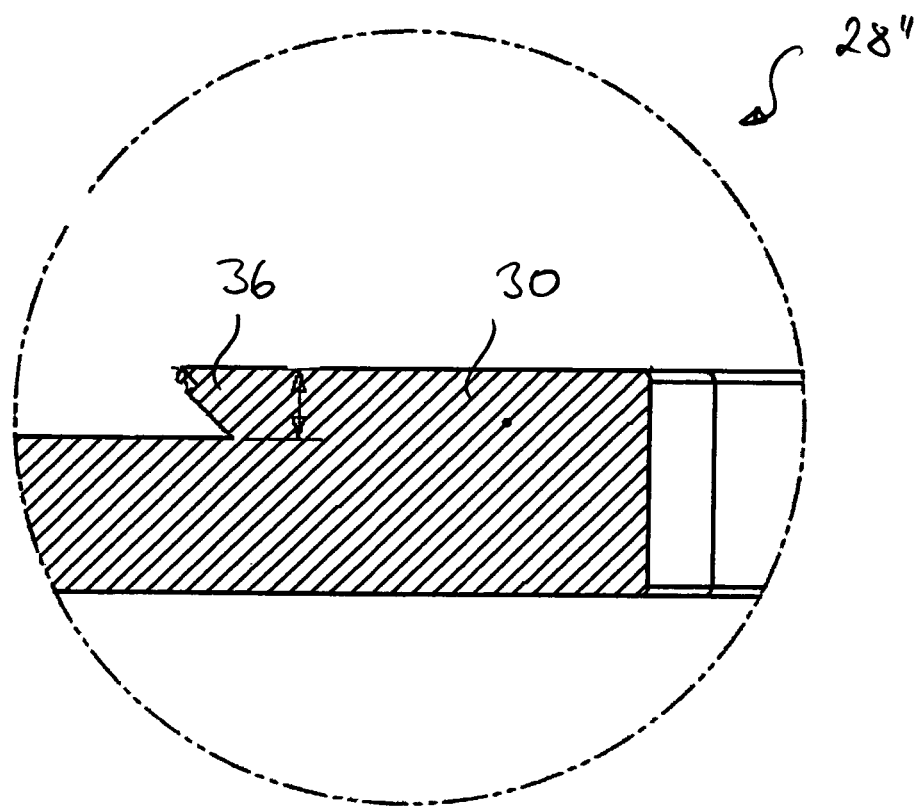
Figure 7:
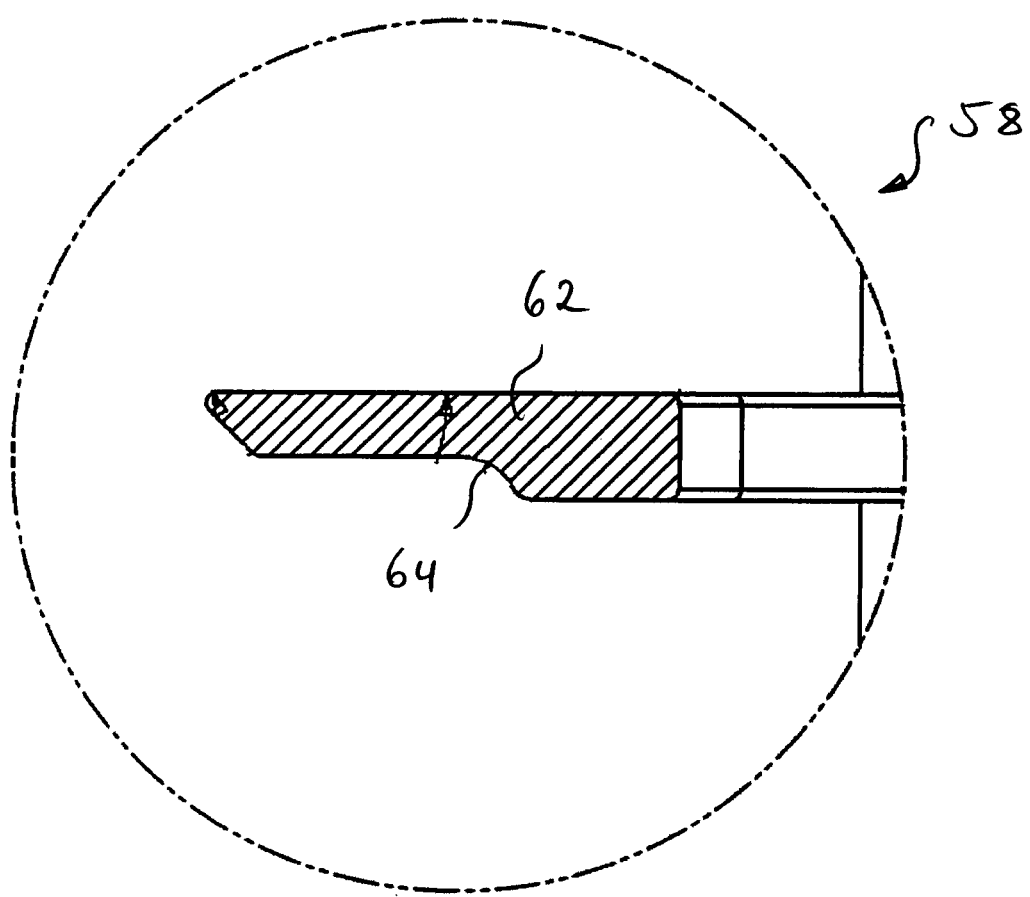
Figure 8:
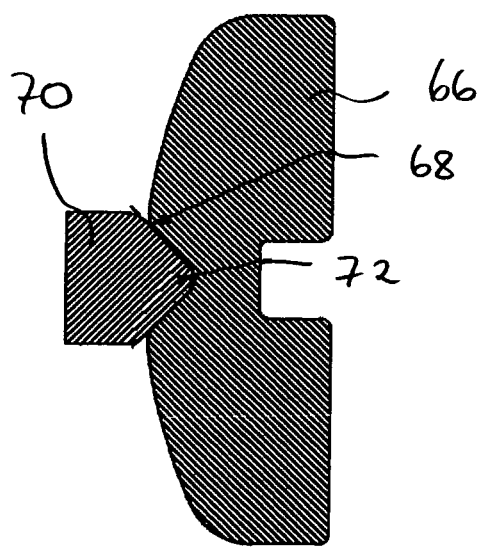

A preferred embodiment of a transport cart, according to the invention, for loading an aircraft galley is now explained more fully with reference to the appended schematic drawings, of which FIG. 1 shows a three-dimensional representation of a transport cart for loading an aircraft galley, FIG. 2 shows a front view of the transport cart according to FIG. 1, FIG. 3 shows a side view of the transport cart according to FIG. 1, FIG. 4 shows a detail cross-sectional view of a first guide device of the transport cart, FIG. 5 shows a detail cross-sectional view of a carrier element and of a further first guide device of the transport cart, FIG. 6 shows a detail cross-sectional view of yet a further first guide device of the transport cart, FIG. 7 shows a detail cross-sectional view of a holding device of the transport cart, and FIG. 8 shows a detail representation of a positioning device of the transport cart, which acts together with a complementary positioning device provided on an aircraft galley to be loaded.

A transport cart 10 illustrated in FIGS. 1 to 8 comprises a plate-type base element 12, which has a substantially rectangular base area. Four wheels 14 are attached to an underside of the base element 12. The base element 12 is disposed at a height that corresponds to the height of a bottom plate of an aircraft galley compartment disposed in a lower section of an aircraft galley. A plurality of rollers 16 are provided in the region of a top side of the base element 12 that is opposite the underside. By means of the rollers 16, an item such as, for example, a box provided to be received in the compartment of the aircraft galley can be pushed easily from the transport cart into the aircraft galley compartment provided to receive the box. Similarly, the rollers 16 facilitate the removal of such a box from the aircraft galley compartment, since the box can be conveniently drawn out of the compartment, onto the base element 12 of the transport cart 10.

In the region of a first edge 18 of the base element 12, a first frame element 20 is attached to the base element 12. Similarly, a second frame element 24 is attached in the region of a second edge 22 of the base element 12 that is opposite the first edge 18 of the base element 12. The frame elements 20, 24 are each constituted by a substantially U-shaped tube, and delimit between them an inner region 26 of the transport cart 10.

A first guide device 28, configured in two parts, is mounted on the frame elements 20, 24. As can be best seen in FIG. 4, the first guide device 28 comprises a first and a second strip 30, 32, which extend parallelwise in relation to the base element 12, the first strip 30 being attached to the first frame element 20 and the second strip 32 being attached to the second frame element 24. A projection 34, 36 is configured, respectively, on the strips 30, 32. The first guide device 28, i.e. the strips 30, 32 constituting the first guide device 28, is/are mounted on the frame elements 20, 24 so as to be swivelable between an operative position and a non-operative position. In their operative position, shown in FIG. 4, the strips 30, 32 of the first guide device 28 project into the inner region 26 of the transport cart 10 delimited by the frame elements 20, 24. In their non-operative position, on the other hand, the strips 30, 32 of the first guide device 28 extend substantially perpendicularly in relation to the base area of the base element 12, and thereby substantially release the inner region 26 of the transport cart 10 delimited by the frame elements 20, 24.

When the first guide device 28 is in its operative position, i.e. the strips 30, 32 of the first guide device 28 project into the inner region 26 of the transport cart 10, the first guide device 28 can engage a complementary second guide device configured on a box that can be received in the aircraft galley to be loaded and provided for transporting on the transport cart 10. The second guide device configured on the box can comprise, for example, grooves for receiving the projections 34, 36 of the first guide device 28, such that the first guide device 28 and the complementary second guide device configured on the box constitute a tongue and groove connection. When the first guide device 28 is in engagement with the complementary second guide device configured on the box, the box received on the transport cart 10 is secured against displacing on the transport cart 10 in a direction perpendicular to a longitudinal axis L of the transport cart 10.

The portion of the inner region 26 of the transport cart 10 that adjoins the base element 12 can be used to transport a box that is dimensioned such that its height occupies substantially the entire space between the base element 12 and a carrier element 38, which is parallel to the base element 12 and attached to the frame elements 20, 24. If the box is provided with a second guide device in the region of its side walls, this second guide device can be brought into engagement with the first guide device 28, in order to secure the box against displacing on the transport cart 10 in a direction perpendicular to the longitudinal axis L of the transport cart 10. If, on the other hand, the box does not have a second guide device, the first guide device 28 can be swivelled into its non-operative position, such that the first guide device 28 does not impede the receiving of the box on the transport cart 10.

Alternatively thereto, the portion of the inner region 26 of the transport cart 10 that is adjacent to the base element 12 can also receive boxes that are disposed over one another and dimensioned such that their height in each case is approximately half the distance between the base element 12 and the carrier element 38. A first box can then be placed on the base element 12. On the other hand, a second box, which is provided with a second guide device in a region of its side walls that is adjacent to a bottom element of the box, can be received on the transport cart 10 in that the second guide device configured on the box is brought into engagement with the first guide device 28 of the transport cart 10, which guide device is in its operative position. If the boxes are dimensioned so as to be smaller, in the direction of the longitudinal axis L of the transport cart 10, than the base element 12, i.e. the boxes are, for example, only half as long as the base element 12, up to four boxes can thereby be disposed in the portion of the inner region 26 of the transport cart 10 that is delimited by the base element 12 and the carrier element 38.

The first guide device 28 of the transport cart 10 is disposed at a height that corresponds to the height of a guide device of the aircraft galley, which guide device, just like the first guide device 28 of the transport cart 10, can be brought into engagement with a second guide device configured on a box. A box held on the transport cart 10 by the first guide device 28 of the transport cart 10 acting together with the second guide device configured on the box can then be easily pushed from the transport cart 10 into the aircraft galley, the second guide device configured on the box engaging the guide device of the aircraft galley.

The transport cart 10 further comprises a locking mechanism 40, which is attached to the second frame element 24, adjacently to the second strip 32 of the first guide device 28. The locking mechanism 40 comprises a first lock 42 and a second lock 44, which are disposed at a distance from each other along the longitudinal axis L of the transport cart 10. As can be best seen in FIG. 3, the first lock 42 is disposed in the region of a first end of the transport cart 10, while the second lock 44 is disposed in the region of a second end of the transport cart 10. The locks 42, 44 can each be swivelled between a locking position, shown in the figures, and a non-locking position.

In the locking position of the locks 42, 44, two extensions 46, 48 of the locks 42, 44 are set up to act together with a front wall or a back wall of a box received on the transport cart 10, and thereby to secure the box against displacement on the transport cart in a direction parallel to the longitudinal axis L of the transport cart 10. As can be best seen in FIG. 2, the extensions 46, 48 of the locks 42, 44 extend at an angle in relation to each other, the extension 46 projecting in the direction of the base element 12, and the extension 48 projecting in the direction of the carrier element 38. As a result, the locks 42, 44 are able to secure, against displacement on the transport cart 10 in a direction parallel to the longitudinal axis L of the transport cart 10, both a box occupying substantially the entire part of the inner region 26 of the transport cart 10 between the base element 12 and the carrier element 38, and boxes that are disposed over each other and whose height in each case is only substantially half of the distance between the base element 12 and the carrier element 38. In their non-locking position, on the other hand, the locks 42, 44 of the locking mechanism 40 allow unimpeded loading and unloading of the transport cart 10.

The locks 42, 44 of the locking mechanism 40 are connected to each other via a coupling device. The coupling device comprises a rod, not illustrated in the figures, which extends in the direction of the longitudinal axis L of the transport cart 10 and carries the locks 42, 44 of the locking mechanism 40. The coupling device couples the locks 42, 44 of the locking mechanism 40 to each other in such a way that, upon a movement of the first lock 42 into its locking position, the second lock 44 is likewise moved into its locking position. Upon a movement of the first lock 42 into its non-locking position, the second lock 44 is likewise moved into its non-locking position. Conversely, a movement of the second lock 44 into its locking position also results in a movement of the first lock 42 into its locking position, and a movement of the second lock 44 into its non-locking position also results in a movement of the first lock 42 into its non-locking position.

The carrier element 38 comprises a first strip 50 and a second strip 52. The first strip 50 is attached to the first frame element 20, while the second strip 52 is attached to the second frame element 24. The strips 50, 52 extend parallelwise in relation to the longitudinal axis L of the transport cart 10, and project into the inner region 26 of the transport cart 10 delimited by the frame elements 20, 24. Connecting elements 54, 56 extend, respectively, between the strips 50, 52, in the region of the first and the second end of the transport cart 10. The carrier element 38 serves to support a bottom element of a box received on the transport cart 10 or a bottom element of another item received on the transport cart 10, which box or item is not provided, for example, with a second guide device.

The carrier element 38 is attached to the frame elements 20, 24 at a height that corresponds to the height of a carrier plate of the aircraft galley that serves to receive aircraft galley components such as, for example, ovens, beverage preparation devices, etc. An aircraft galley component received on the carrier element 38 of the transport cart 10 can then be conveniently pushed from the transport cart 10 to its destination position in the aircraft galley without the need to raise or lower the aircraft galley component. Further, the spacing of the frame elements 20, 24 in the region of the carrier element 38 and above the carrier element 38 is greater than in the region of the base element 12, to enable the transport cart 10 to be used also for transporting aircraft galley components such as, for example, ovens, beverage preparation devices.

As is most evident from FIG. 5, a further first guide device 28' is attached to the carrier element 38. In a manner similar to the first guide device 28, the further first guide device 28' can also be swivelled between an operative position and a non-operative position. When the further first guide device 28' is in its operative position, it can be used to fix a conventional box on the transport cart 10, which box is provided with a second guide device. It its non-operative position, on the other hand, the further first guide device 28' enables a galley component such as, for example, an oven, to be received on the transport cart 10 in an unimpeded manner.

As is most evident from FIG. 6, above the carrier element 38 a yet further first guide device 28" is mounted on the frame elements 20, 24 of the transport cart, but cannot be swivelled, like the first guide devices 28, 28', between an operative position and a non-operative position. By means of the first guide device 28", two boxes can be received over one another on the transport cart 10, in the portion of the inner region 26 of the transport cart 10 disposed above the carrier element 38, and secured against displacing in a direction perpendicular to the longitudinal axis L of the transport cart 10. For the purpose of securing these boxes against displacement on the transport cart 10 in a direction parallel to the longitudinal axis L of the transport cart, a further locking mechanism 40' is provided, the structure and functioning of which correspond to the structure and functioning of the locking mechanism 40.

Finally, the transport cart 10 is provided with a holding device 58. The holding device 58, shown in an enlarged representation in FIG. 7, comprises a first strip 60, attached to the first frame element 20, and comprises a second strip 62, attached to the second frame element 24. The strips 60, 62 project into the inner region 26 of the transport cart 10 and are each provided, on their underside, with a receiving portion 64 configured with a curve. The receiving portion 64 serves to act together with a box received at the top of the transport cart 10, and thereby additionally to hold the box in its position on the transport cart 10.

The maximum spacing of the frame elements 20, 24 of the transport cart 10, which defines the maximum width of the transport cart 10, is selected such that it is less than the width of an aisle of an aircraft in which the aircraft galley to be loaded by means of the transport cart 10 is disposed. As a result, the transport cart 10 can be pushed easily and conveniently through the aisle of the aircraft to the aircraft galley to be loaded.

To facilitate the positioning of the transport cart 10 relative to the aircraft galley to be loaded, a positioning device 66, shown in an enlarged representation in FIG. 8, is provided on the transport cart 10. The positioning device is attached to the base element 12 and provided with a recess 68. The positioning device 66 of the transport cart 10 acts together with a complementary positioning device 70, provided on the aircraft galley to be loaded and likewise represented in FIG. 8 in order to illustrate the functioning of the positioning device 66, when the transport cart 10 has attained a desired position relative to the aircraft galley to be loaded. In particular, a projection 72 provided on the positioning device 70 of the aircraft galley acts together with the recess 68 of the positioning device 66 of the transport cart 10.

For example, the aircraft galley can be divided into a plurality of sections in the vertical direction, a positioning device 70, for acting together with the positioning device 66 of the transport cart 10, being assignable to each of these sections. The transport cart 10 can then be positioned in front of each of these sections, such that boxes can be conveniently pushed from the transport cart 10 into the aircraft galley. Similarly, boxes can be conveniently received on the transport cart 10, out of the aircraft galley, by means of the first guide devices 28, 28', 28" disposed at a corresponding height, and by means of the carrier element 38 disposed at a corresponding height and the base element 12 disposed at a corresponding height.

Particularly convenient operation of the transport cart 10 is rendered possible in that a blocking device, not illustrated in greater detail in the figures, comprises a plurality of actuating devices for blocking the wheels 14 of the transport cart 10. The actuating devices are disposed in the region of the first end and in the region of the second end of the transport cart 10, such that the blocking device can be actuated to block the wheels 14 of differing sides of the transport cart 10.

A further embodiment of a transport cart for loading an aircraft galley, which is not shown in the figures, differs from the transport cart 10 illustrated in FIGS. 1 to 8 in that it is of a lesser height, i.e. its frame elements project only over the transport element 38. In the case of such a transport cart, it is possible to dispense with the first guide device 28" and the holding device 58. In other respects, the structure and functioning of such a cart correspond to the structure and function of the transport cart 10 shown in FIGS. 1 to 8.

The invention claimed is:

1. Transport cart for loading an aircraft galley, comprising:
    a base element,
    a plurality of wheels attached to the base element, and
    two frame elements connected to the base element and disposed at a distance from each other,
    at least one first guide device, which is set up for engaging a complementary second guide device formed on a box that is receivable in the aircraft galley to be loaded and provided for transporting on the transport cart, and which is further set up for securing a box, received on the transport cart, against displacement on the transport cart in a direction perpendicular to a longitudinal axis of the transport cart when engaged with the complementary second guide device formed on the box, characterized by
    at least one locking mechanism, which comprises a first and a second lock, the first and the second lock being attached to a frame element, at a distance from each other along the longitudinal axis of the transport cart, and being set up to interact with a front wall or a back wall of a box received on the transport cart, in order to secure the box against displacement on the transport cart in a direction parallel to the longitudinal axis of the transport cart.

2. Transport cart according to claim 1,
characterized in that the first guide device is swivelable between an operative position, in which it can engage a complementary second guide device configured on a box, and a non-operative position, in which no connection of the first guide device to a complementary second guide device configured on a box is possible.

3. Transport cart according to claim 2,
characterized in that the first guide device, in its operative position, projects into an inner region of the transport cart delimited by the frame elements, and the first guide device, in its non-operative position, substantially releases the inner region of the transport cart delimited by the frame elements.

4. Transport cart according to claim 1,
characterized in that the first guide device and the complementary second guide device formed on the box constitute a tongue and groove connection.

5. Transport cart according to claim 1,
characterized in that the locking mechanism comprises a coupling device that couples the locks of the locking mechanism to each other in such a way that, upon a movement of the first lock into a locking position, the second lock is likewise moved into a locking position and, upon a movement of the first lock into a non-locking position, the second lock is likewise moved into a non-locking position.

6. Transport cart according to claim 1,
characterized by a carrier element that is set up to support a bottom element of a box received on the transport cart or a bottom element of an aircraft galley component received on the transport cart.

7. Transport cart according to claim 1,
characterized in that the first guide device is mounted on a frame element or on the carrier element.

8. Transport cart according to claim 1,
characterized in that the first guide device and/or the carrier element is/are disposed in a position on the transport cart that is adapted to a position of an arrangement for receiving a box provided for transporting on the transport cart, or an aircraft galley component in the aircraft galley, in such a way that a box or aircraft galley component received on the transport cart can be loaded from the transport cart into the aircraft galley substantially through a horizontal displacement.

9. Transport cart according to claim 1,
characterized in that a plurality of rolls are disposed in the region of a top side of the base element.

10. Transport cart according to claim 1,
characterized in that a blocking device for blocking the wheels of the transport cart comprises a plurality of actuating arrangements.

11. Transport cart according to claim 1,
characterized by a holding device, which is set up to interact with at least one of a cover element and side walls of a box received on the transport cart.

12. Transport cart according to claim 1,
characterized by a positioning device, which is set up to interact with a complementary positioning device provided on the aircraft galley to be loaded, in order to position the transport cart relative to the aircraft galley to be loaded.

13. Transport cart according to claim 12,
characterized in that the positioning device of the transport cart is attached to the base element and/or is provided with a recess that is set up to receive a projection of the complementary positioning device provided on the aircraft galley to be loaded when the transport cart has attained a desired position relative to the aircraft galley to be loaded.

14. Transport cart according to claim 1,
characterized in that the spacing of the two frame elements connected to the base element is less than the width of an aisle of an aircraft in which the aircraft galley to be loaded is disposed.

\* \* \* \* \*